United States Patent
Chen et al.

(10) Patent No.: US 6,890,507 B2
(45) Date of Patent: May 10, 2005

(54) OZONE TREATMENT OF FLY ASH

(75) Inventors: Xu Chen, Providence, RI (US);
Yuming Gao, Providence, RI (US);
Robert H. Hurt, Barrington, RI (US);
Eric M. Suuberg, Barrington, RI (US);
Arun K. Mehta, Los Altos, CA (US)

(73) Assignee: Brown University Research Foundation, Providence, RI (US)

( * ) Notice: Subject to any disclaimer, the term of this patent is extended or adjusted under 35 U.S.C. 154(b) by 0 days.

(21) Appl. No.: 10/246,127

(22) Filed: Sep. 17, 2002

(65) Prior Publication Data

US 2003/0066461 A1 Apr. 10, 2003

Related U.S. Application Data

(63) Continuation-in-part of application No. 09/935,276, filed on Aug. 22, 2001, now Pat. No. 6,521,037.

(51) Int. Cl.$^7$ .................. C04B 18/04; C04B 18/06; B01D 53/64; C01C 1/44
(52) U.S. Cl. .................. 423/460; 106/405; 106/472; 106/697; 106/705; 106/717; 106/814; 106/DIG. 1; 423/210; 423/414; 423/445 R; 423/447.6; 502/416; 588/251; 588/257
(58) Field of Search .................. 106/405, 472, 106/697, 705, 717, 814, DIG. 1, 404; 423/210, 414, 445 R, 447.6; 502/416; 588/251, 257

(56) References Cited

U.S. PATENT DOCUMENTS

| | | | | |
|---|---|---|---|---|
| 3,023,118 A | * | 2/1962 | Donnet | 106/473 |
| 4,537,599 A | * | 8/1985 | Greenwald, Sr. | 44/550 |
| 5,555,821 A | * | 9/1996 | Martinez | 110/191 |
| 5,749,308 A | * | 5/1998 | Bachik | 110/344 |
| 5,868,084 A | * | 2/1999 | Bachik | 110/257 |
| 6,136,089 A | | 10/2000 | Hurt et al. | 106/705 |
| 6,395,145 B1 | * | 5/2002 | Altman | 204/164 |
| 6,471,933 B1 | * | 10/2002 | Dotson | 423/449.5 |
| 6,521,037 B1 | * | 2/2003 | Hurt et al. | 106/405 |
| 2002/0058002 A1 | * | 5/2002 | Altman | 422/186.12 |
| 2003/0206843 A1 | * | 11/2003 | Nelson, Jr. | 423/210 |

FOREIGN PATENT DOCUMENTS

JP 62-108755 * 5/1987

OTHER PUBLICATIONS

Gao et al in Fuel, vol. 80 (2001), pp. 765–768, (no month).

* cited by examiner

*Primary Examiner*—Anthony J. Green
(74) *Attorney, Agent, or Firm*—Armstrong, Kratz, Quintos, Hanson & Brooks, LLP

(57) ABSTRACT

Carbon-containing fly ash has been treated with optimum amounts of ozone. There is homogenous treatment of the fly ash with ozone and over saturation with ozone is avoided. In a further embodiment of the invention carbon, from various sources is oxygenated to be incorporated into concrete. The preferred oxygenating agent is ozone.

16 Claims, 8 Drawing Sheets

OZONE TREATMENT OF FLY ASH

RELATED APPLICATIONS

This application is a continuation-in-part of application Ser. No. 09/935,276 filed Aug. 22, 2001 now U.S. Pat. No. 6,521,037.

FIELD OF THE INVENTION

The herein disclosed invention finds applicability in the field of fly ash improvement; and more specifically improving the performance of fly ash when used as an additive in air-entrained concrete.

BACKGROUND OF THE INVENTION

Coal combustion fly ash is a useful additive in concrete due to its pozzolanic property—i.e., its ability to react with calcium in concrete mixes and thus contribute to the formation of the cementitious matrix. Through this mechanism, fly ash serves as a partial replacement for Portland cement, yielding cost savings as well as a variety of concrete property enhancements, which may include reduced permeability, improved workability, increased long-term strength, and reduced threat of long-term failure due to alkali-silica reaction.

Carbon in fly ash is an undesirable contaminant in cases where fly ash is used as a pozzolanic admixture in concrete. Carbon adsorbs the surfactants or "air entraining admixtures" used in concrete making them unavailable for their primary function. U.S. Pat. No. 6,136,089 and publication (Gao et al., 2001) teach the use of ozone to chemically passivate the surfaces of carbon in ash in order to improve air entrainment behavior. This process leaves the carbon in place, but adds surface oxygen complexes whose presence inhibits adsorption of the surfactant.

A practical problem with this recycling technology is the tendency of residual carbon in ash to interfere with the air entrainment process in concrete. Porous carbon adsorbs the chemical surfactants (air entraining admixtures, or AEAs) used to generate and stabilize a micro-void system in concrete pastes. Without a sufficient network of sub-millimeter air bubbles, concrete fails under internal pressure generated by the freezing and expansion of trapped residual water. About two-thirds of the concrete in North America is air entrained, and this surfactant adsorption phenomenon is the primary driving force for national and regional regulations limiting the carbon content of ash used in concrete.

Ash samples from the field show great variability in the extent to which they adsorb AEAs. Recent work has identified the following four primary factors governing ash adsorptivity: (1) the mass fraction carbon, (2) the total surface area of the carbon, (3) the accessibility of that surface, as governed by particle size and pore size distribution, and (4) the carbon surface chemistry. The inorganic fraction of ash is found to play a very minor role in AEA adsorption.

The role of carbon surface chemistry is particularly apparent from the behavior of ash during thermal oxidation in air. Introduction of surface oxides by exposure to air at 350–450° C. has been observed to significantly reduce subsequent AEA adsorption without consuming a measurable amount of carbon. In contrast, treatment in inert gas at temperatures sufficient to drive-off many pre-existing surface oxides (900° C.) has been observed in increase adsorption. Commercial carbon blacks subjected to surface oxidation processes have also been observed to be less adsorptive than non-treated varieties. Both of these observations suggest that oxide-free carbon surfaces are the most active for adsorption of surfactants. The important role of a non-polar (oxide-free) surface is not surprising, as polar functionalities are already abundant in concrete pastes (on inorganic fly ash particles, cement particles, aggregate particles, and in the aqueous solution), whereas the only non-polar components are air bubbles and a portion of the carbon surface. It is likely that the non-polar portions of the carbon surfaces compete directly with the air bubbles for the non-polar portions of the surfactant molecules. This insight suggests that the deleterious effect of carbon could be suppressed by intentional oxidation of the largely non-polar carbon surfaces.

Possibilities for intentional surface oxidation include dry and wet chemical methods. Many wet oxidation agents have been used to surface treat other carbon materials, including $HNO_3$, $H_2O_2$ $CH_3COOH$, and $(NH_3)_2S_2O_8$, but for the treatment of ash these wet processes would have practical disadvantages, including high drying costs, and potential problems with self-cementation or loss of pozzolanic activity. Dry oxidation in air requires temperatures above about 300° C., and is not likely to offer advantages over commercial combustion-based processes, which remove the carbon altogether while operating at only modestly higher temperatures. For these reasons, this patent focuses on ozone, $O_3$, as an oxidant capable of attacking carbon surfaces in ash in the dry state and at ambient temperature.

Attention is brought to the fact that Gao et al in Fuel, Vol. 80 (2001), pages 765 to 768 have published an article related to the ozonation of fly ash.

Prior art U.S. Pat. No. 6,136,089 to Hurt et al teaches a method for ozonating fly ash in order to deactivate carbon in fly ash. The method of the patent uses 500 ppm ozone in air at 0.9 lit/min. in a packed or fixed bed treatment. Treatment of fly ash in a pneumatic conveyor tube is taught. The patent also teaches the use of a fluidized bed to ozonate fly ash. Ozonation of fly ash while the fly ash is stored in a silo is also taught. However, what is not taught by the patent, are unobvious, favorable processing conditions for the economic ozonation of fly ash. The favorable processing conditions are attained by making certain that there are favorable contact conditions between the ozone and the fly ash to be treated. The herein disclosed invention is designed to produce a process wherein the fly ash is optimally treated with ozone. The process assures that over saturation does not occur with its attendant waste of ozone. For example, data presented in the patent clearly shows that sustained upflow through a stationary bed leads to over saturation of the bottom portion of the bed with the attendant excessive use of ozone and the unnecessary gasification of carbon. Large-scale utility application of the process of U.S. Pat. No. 6,136,089 involving deep beds, and fixed-bed contacting schemes will be uneconomic. For this reason, the ash bed must be continuously mixed or transported by mechanical or aerodynamic means to prevent prolonged contact of any part of the bed with fresh ozone. Further, the amount of ozone relative to the fly ash in the herein disclosed invention is controlled; e.g., gm-ozone/kg-carbon. This is a basis for the herein disclosed invention. Embodiments of the invention are presented below.

OBJECTS OF THE INVENTION

An important object of this invention is to treat fly ash with ozone in an efficient manner.

A most significant factor to bear in mind is that the invention disclosed herein recognized for the first time the importance of the quantity: gm-ozone/kg-carbon.

A further object of this invention is to treat fly ash with ozone in an economic manner.

A most important object of this invention is to add ozone to sources of carbon other than the carbon found in ash.

These and other objects of the present invention will become apparent from a reading of the following specification taken in conjunction with the enclosed drawings.

BRIEF SUMMARY OF THE INVENTION

In its broadest aspect, the herein disclosed invention is directed to ozone-treated carbon-containing fly ash wherein the ozone has treated the fly ash in a homogenous fashion so as not to over or under ozonize the fly ash. The ozone treated fly ash can be homogeneously contacted wherein no portion of ash experiences prolonged exposure to ozone resulting in consumption of greater than 300 gram-ozone/kg-carbon for class C ashes or greater than 100 gram-ozone/kg-carbon for class F ashes.

The patent envisions a method for the homogeneous ozonation of fly ash to make the fly ash into a useful additive for concrete which method comprises continuously mixing fly ash with ozone assuring that no part of the fly ash has prolonged contact with the ozone such that no part of the fly ash consumes greater than 300 gram-ozone/kg-carbon for class C ashes or greater than 100 gram-ozone/kg-carbon for class F ashes and assuring that over saturation with ozone does not occur.

Also, envisioned by this invention is a method for homogenous ozonation of fly ash to render said fly ash useful as an additive to concrete comprising operating a contactor in a batch mode to contact a fly ash bed with ozone for two minutes and purging the fly ash bed for three minutes with ozone-free air, wherein the fly ash is constantly brought into contact with the ozone such that the contacting takes place to produce a fly ash in the desired range of 10–100 gm-ozone per kg carbon in ash for class F ashes or 30–300 gm-ozone per kg carbon in class C ashes. The process can take place in a contactor able to employ 64 lit/sec of 5% ozone in either oxygen or air for two min/batch to yield 1.5 gm-ozone/kg-ash with the batch time comprising two minutes of ozone contact time and three minutes of purging. The process can have the fly ash contacted with 0.2–5 gm-ozone/kg of ash while avoiding over exposure of the fly ash with ozone.

Viewed another way the herein disclosed invention involves a process in which carbon-containing fly ash is treated with ozone-containing gas in the amount 0.2–5 g-ozone/kg ash to improve the quality of ash for applications in concrete or related construction products. Carbon-containing fly ash is treated with ozone-containing gas in the amount 10–300 g-ozone-kg-carbon to improve the quality of ash for applications in concrete or related construction products. The carbon-containing fly ash is treated with ozone-containing gas in the amount 1–50 $\mu$moles-ozone/m²-total-carbon-surface area to improve the quality of ash. The process of the invention contacts ash uniformly with an ozone-containing gas in such a way as to provide no opportunity for overexposure of part of the ash. In the process the ash is contacted with ozone in a device incorporating mechanical agitation, such as a solids blender, screw conveyer or ash conditioner. Alternatively, the process involves ash contacted with ozone in a device incorporating a fluid bed, spouted bed, circulating fluid bed, transport reactor, or a pneumatic conveying system.

DESCRIPTION OF THE INVENTION

Figure 7:
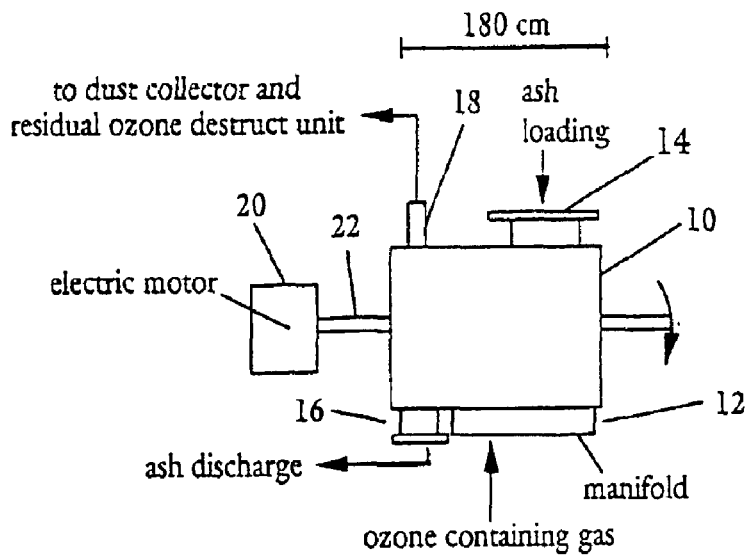
FIGS. 7–9 are views describing an example of a contactor that could be used to ozonate fly ash.
Figure 8:
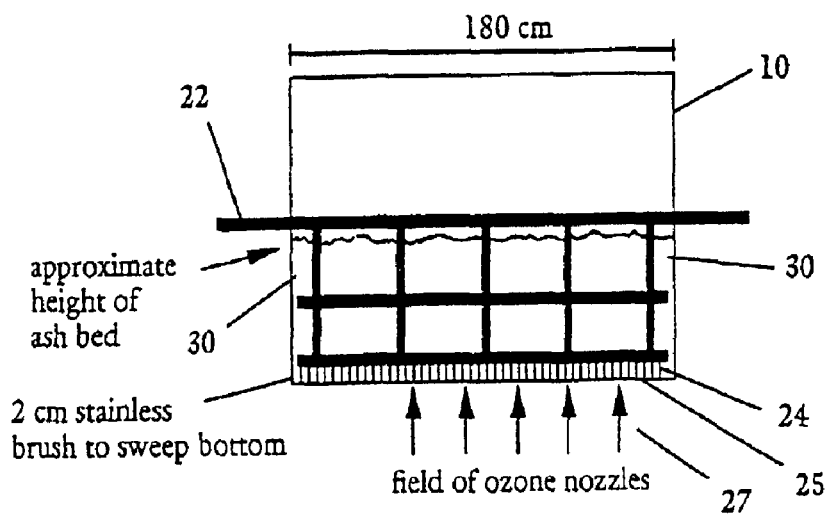
Figure 9:
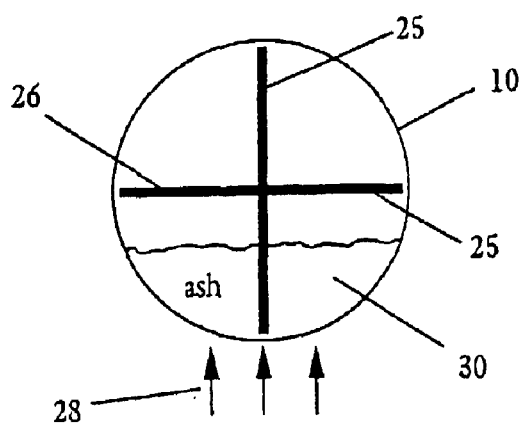

An exemplary process for carrying out the process of this invention could involve a contactor as described in FIGS. 7–9 which would treat roughly 175 tons/day of fly ash, equivalent to the complete fly ash stream from a typical full-scale commercial coal-fired boiler producing about 50,000 tons of ash/year. The contactor is operated in batch mode with a processing time of five minutes, comprising an ozone contact time of two minutes, and three minutes for purging the ash bed with ozone-free air, to get rid of remnants of unreacted ozone, then discharging the treated ash, and loading a new ash batch. The contactor contains a rotary stirring element to agitate the bed, constantly bringing fresh ash in contact with the ozone fed from below. For example, the ozone-containing gas is to be charged uniformly through 50 nozzles in the contactor flow to produce small jets of ozone containing air or oxygen. Other contactor designs could be produced as understood by those skilled in the art.

The stirring element is designed to provide maximum radial mixing (with little axial mixing) in order to minimize the time that any portion of the ash is exposed to the fresh ozone at the nozzle exits. With four blades at the chosen speed of 12 RPMs, the ash will be swept from the nozzle once every second. With a processing time of two minutes, there will be 12×2×4=96 sweeps of the nozzle exits, ensuring adequate opportunity for all ash particles to contact ozone while avoiding over saturation. Many aspects of this process can be varied, including processing time, ozone concentration, flow rate, and continuous vs. batch operation, as long as the ash is agitated continuously and the total ozone input lies in the desired range: 10–100 gm-ozone/kg carbon in ash (for class F ashes) or 30–300 gm-ozone/kg carbon in ash (for class C ashes). The treated ash is discharged and used as a pozzolanic admixture in Portland cement concrete.

With reference to FIGS. 7–9 a schematic representation of a cylindrical batch contactor 10 is shown. Referring specifically to FIG. 7, the cylindrical batch contactor 10 has an ozone gas supply manifold 12, an ash loading port 14, an ash discharge port 16, dust collection and residual ozone destruct exit 18. The contactor is driven by an electric motor 20 and shaft 22. FIG. 8 is a view of the interior of the contactor showing brushes 24 to sweep bottom 25 of the contactor 10 along with the field of ozone nozzles 27. Typical dimensions of a contactor as set forth in this example are described by the following measurements: diameter 90 cm, length 180 cm, ash bed height approximately 45 cm.

Referring to FIG. 9 there is shown an end view of the cylindrical contactor 10 showing a four-blade stirrer 26 with the arrows 28 showing points of gas addition. In FIGS. 8 and 9 the fly ash 30 is shown.

A typical apparatus for carrying out the ozone treatment of fly ash as envisioned by this invention is shown in FIGS. 7–9. A summary of design parameters are as follows:

| | |
|---|---|
| Ash through put | 175 tons/day |
| Contactor dimensions | 1.8 meter length |
| | 0.90 meter diameter |
| Contactor materials | stainless steel |
| Gas type/flow | 64 lit/sec of 5% ozone |
| | (In oxygen or air) of 2 min/batch |
| | (this yields 1.5 gm-ozone/kg-ash) |
| Ash bed mass | 560 kg |
| Ash bed depth | approx. 45 cm |
| Batch contact time | 5 minutes, comprising 2 minutes for ozone contacting, plus 3 minutes for air purging, ash charging and discharging |
| Stirring speed | 12 RPM |
| Nozzles | 48 holes in 3 rows in contactor floor with porous plugs to prevent ash backflow |

In operation ash is loaded into the contactor through ash port 14, the electric motor is actuated and ozone is fed into the contactor 10 while the fly ash 30 is being stirred by the stirrer 26. Proper agitation and proper supply of ozone to fly ash will produce optimum ozonation.

The herein disclosed invention in a broad aspect envisions processes in which an ozone-containing gas is contacted with carbon-containing fly ash subjected to mechanical agitation in a manner that ensures no portion of the ash experiences prolonged exposure to ozone resulting in consumption of greater than 300 gram-ozone/kg-carbon for class C ashes, or greater than 100 gram-ozone/kg-carbon for class F ashes. This aspect of the invention is based on the finding that over saturation makes the process uneconomic (or at least sub-optimal). There was no mention in the prior art of the over saturation issue. Agitation/mixing can be accomplished by vibration, gas flow, mechanical stirring, conveying or by use of a screw conveyer.

The definition of both Class F and Class C Fly Ash as industry standards can be found in "Fly Ash in Cemet and concrete" by Richard Helmuth, published by the Portland "Cemet Association (1987) page 18. In this publication Helmuth summarizes ASTM C618-85 standards for Class F and Class C fly ash.

The inventors contemplate contacting the fly ash with any method of contacting that does not lead to over saturation. The desired effect is homogenous contacting processes in which an ozone-containing gas is homogeneously contacted with carbon-containing fly ash in a manner that ensures no portion of the ash experiences prolonged exposure to ozone resulting in consumption of greater than 300 gram-ozone/kg-carbon for class C ashes, or greater than 100 gram-ozone/kg-carbon for class F ashes. Example contacting systems include fluid beds, pneumatic conveying systems, and processes using mechanical agitation of the ash.

Figure 1:
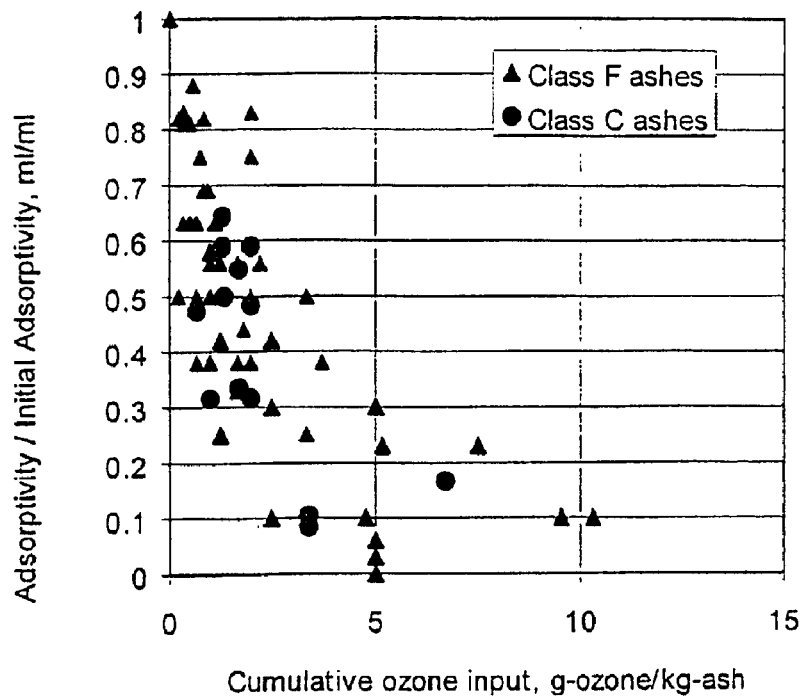
FIG. 1 describes the effect of ozone treatment on surfactant adsorptivity of commercial fly ash samples. Data points represent a range of ash types, bed masses (50–400 gm), ozone concentrations (500 ppm—2 vol-%), and contact times (10–800 min) All data are for fixed bed treatment at ambient temperature and pressure. Ozone usage is expressed in gms ozone per kg-ash.

FIG. 1 shows surfactant adsorptivity as a function of the total (integrated) amount of ozone charged through fixed beds of ash in upflow. Ozone concentrations ranged from 500 ppm–2 vol-%, fixed beds of ash contained 50–200 gms, contact times varied from 1 minute–20 hours, and the samples include a variety of commercial ash samples. In these thick bed experiments, the ozone usage is typically limited by the rate of supply, and therefore the cited contact times do not reflect the true reaction kinetics, which are believed to be fast (see below). The ozonated ash samples were removed and a standard surfactant adsorptivity determined by the foam index test, a simple titration procedure used previously to quantify ash adsorptivity [2, 3]. Sharp reductions in adsorptivity are observed between 0 and 3 gm-$O_3$/kg-ash. The time-resolved measurements of ozone exit concentration yield traces which vary with conditions, but typically resemble breakthrough curves in adsorber beds, exhibiting an initial period of near zero concentration followed by a rapid (though not instantaneous) rise. These traces indicate that ozone is consumed during treatment, and the curve shapes suggest relatively rapid kinetics. Based on these continuous measurement of outlet ozone concentration, a very high fraction of the charged ozone reacts within the bed for the subset of data in FIG. 1 lying below 3 gm-$O_3$/kg-ash on the abscissa. Thus, the initial portion of FIG. 1 (0–3 gm-$O_3$/kg-ash) can be reasonably regarded as an intrinsic relation between adsorptivity and amount of ozone reacted for these ashes, while the data beyond 3 gm $O_3$/kg ash overstate the actual ozone requirement due to unreacted reagent loss.

Figure 2:
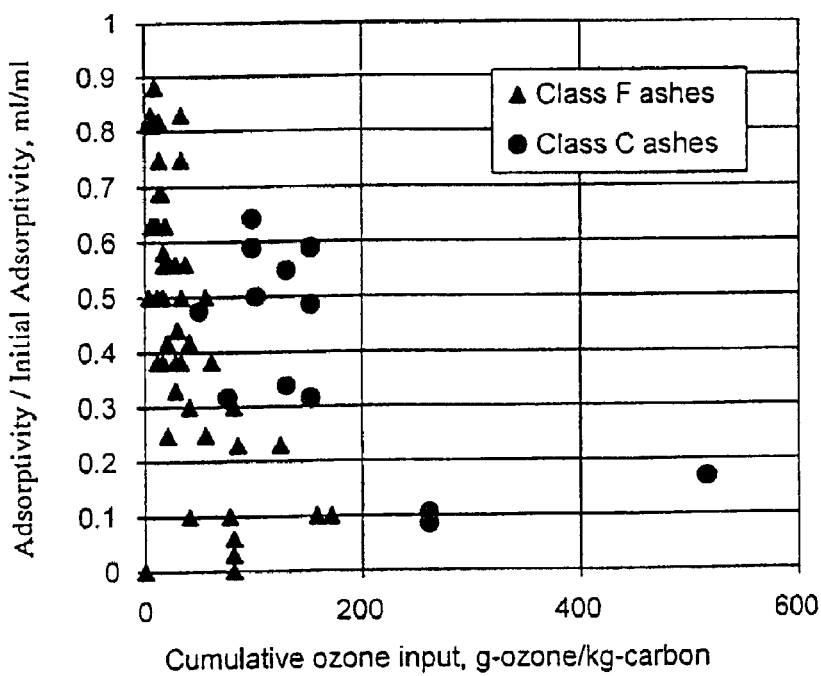
FIG. 2 describes the effect of ozone treatment on surfactant adsorptivity of commercial fly ash samples. Conditions are as in FIG. 1, but ozone usage is expressed in gms ozone per kg carbon which is the main reactant with ozone and main source of the surfactant adsorption.

FIG. 2 shows the same data with ozone usage plotted per unit mass of carbon, rather than unit mass of ash. The carbons in class C ashes (all of which in this study derive from subbituminous coals) are seen to require more $O_3$ to achieve the same effect observed with class F ashes (all of which in this study derive from bituminous coals). This trend is consistent with the higher specific surface adsorptivity of carbons in most class C ashes. The similar behavior of class F and C ashes in FIG. 1 is believed to be the fortuitous result of two offsetting effects—the class C ashes have lower carbon contents but higher specific carbon adsorptivities. Additional experiments indicate that the reduction in adsorptivity persists during ash storage in bottles under ambient conditions for up to nine months (the longest time examined).

Figure 3:
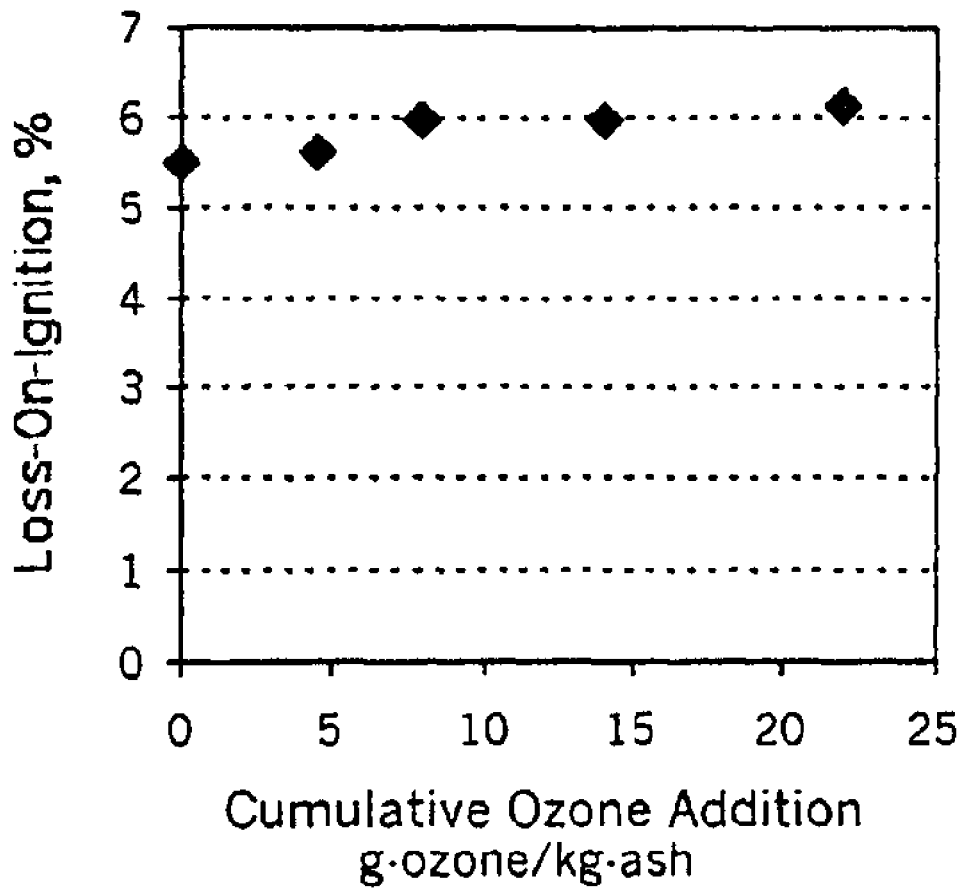
FIG. 3 describes the effect of ozonation on Loss-on-Ignition (LOI), a standard test measuring fractional sample weight loss upon air oxidation at 700° C., often used as an approximate measure of residual combustible matter in ash. Data indicate negligible carbon consumption in these experiments up to at least 20 gm-$O_3$/kg-ash, and further suggest a slight weight gain instead, due to the addition of chemisorbed oxygen on carbon or slight mineral oxidation.

There is evidence from several sources that the mechanism of adsorptivity reduction is reactive modification of carbon surfaces leading to loss of accessible area and changes in surface chemistry. First, FIG. 3 shows that the effect is not related to carbon burnout, as carbon consumption is negligible in these experiments up to 20 gm-$O_3$/kg-ash. In fact, the data suggest a slight increase in loss-onignition (LOI) presumably due to addition of chemisorbed oxygen on carbon and/or to slight mineral oxidation. Secondly, Table 1 below shows that heating previously-ozonated ash samples to 1,000° C. in helium for 10 minutes (a sufficient temperature to drive off most surface oxides) restores most of the initial adsorptivity (see last entry in Table 1). Table 1 also shows the effect of ozonation of total surface area. For ash #1, total area (by $N_2$ BET) is not materially affected by ozonation. Ash #2 shows significant area reduction, (similar to that observed by Deitz and Bitner during ozonation of charcoal), but not nearly enough to fully explain the large decreases in surfactant adsorptivity. Both surface area reduction and modification of surface chemistry are thus believed to contribute to the passivation.

TABLE 1

Properties of Raw and Ozonated Ashes

| Ash Sample | Specific Surfactant Adsorptivity (ml/gm-carbon) | Carbon Surface Area ($N_2$ BET) ($m^2$/gm-carbon) |
|---|---|---|
| Ash #1, class F, from bituminous coal, 33% LOI | 2.8 | 50.4 |
| Ash #1 ozonated | 1.0 | 53.4 |
| Ash #2, class F, from bituminous Coal, 6.1% LOI | 3.9 | 51.3 |
| Ash #2 ozonated | 0.8 | 38.1 |
| Ash #2 heavily ozonated | 0.0 | 26.3 |
| Ash #2 heavily ozonated (as above) then heated at 1000° C. in Helium | 3.0 | not measured |

Figure 4:
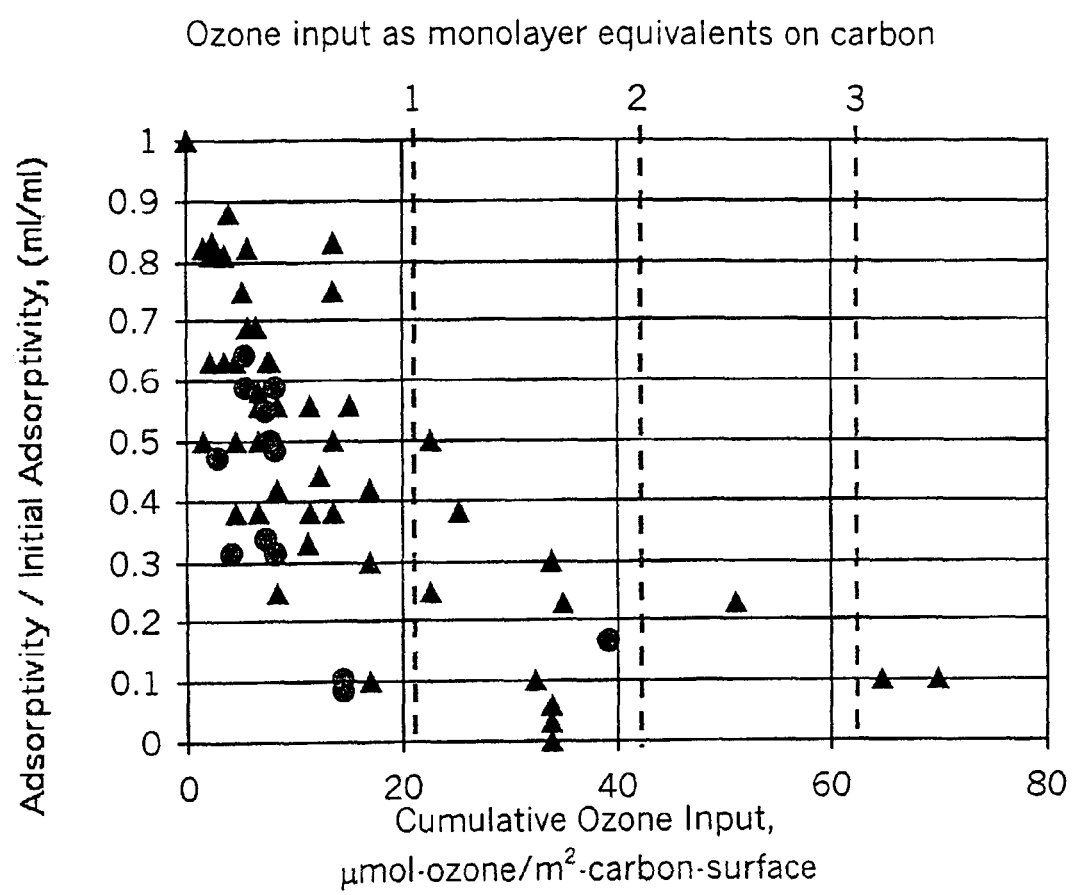
FIG. 4 describes the data from FIG. 1 with ozone feed expressed per unit carbon surface area (by $N_2$ BET). Also shown is the ozone feed expressed as number of monolayer equivalents (top axis) calculated assuming one chemisorbed oxygen atom (0.28 nm Van der Waals diameter) per molecule of $O_3$ reacted.

FIG. 4 provides additional evidence that surface treatment is the underlying mechanism. This plot unifies the data in FIG. 2 by normalizing the ozone requirement by total carbon surface area (by $N_2$ BET). The ozone required to achieve a given effect is directly proportional to the amount of carbon surface present. The precise reaction stoichiometry is still under investigation, but it is, nevertheless, useful to assume a likely stoichiometry from literature data (on other carbon materials) and to convert the abscissa in FIG. 4 from mol-$O_3$-charged/$m^2$-carbon-surface to an equivalent number of oxide layers on the carbon surface. The alternate abscissa at the top of FIG. 4 was calculated assuming one chemisorbed oxygen atom at a Van der Waals diameter of 0.28 nm, per molecule of ozone destroyed. On this scale, the major reduction in adsorptivity is seen to occur between zero and one—i.e., during the formation of an oxide monolayer.

Figure 5:
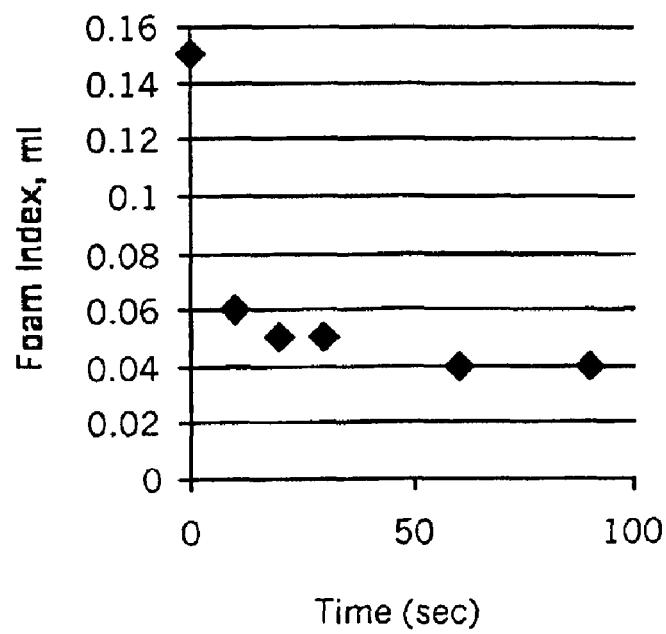
FIG. 5 shows short-time data showing the rapid kinetics of the ozone surface treatment. With proper ozone supply and contacting, most ash samples can be treated to show acceptable foam index values with contact times of 5–10 seconds or less.

FIG. 5 shows short-time data that gives information on the intrinsic kinetics of the reaction between ozone and fly ash carbon. The desired effect on foam index can be achieved with contact times of no more than five seconds. The longer contact times reported in FIGS. 1–4 do not reflect the kinetics of the process, but rather the time taken to add the total desired amount of ozone in the particular deep bed experiments performed.

Based on these results, a positive benefit for ash quality can be obtained if ash is treated with ozone at amounts greater than 0.25 gm-ozone/kg-ash, or greater than 10 gm-ozone/kg-carbon-in-ash, with further benefit coming with larger ozone usages. For reasons of efficiency, it is important to use the minimum amount of ozone to achieve the desired effect on air entrainment. Additional data are shown below that indicate the proper conditions and contacting methods to achieve efficient ozone usage.

Figure 6:
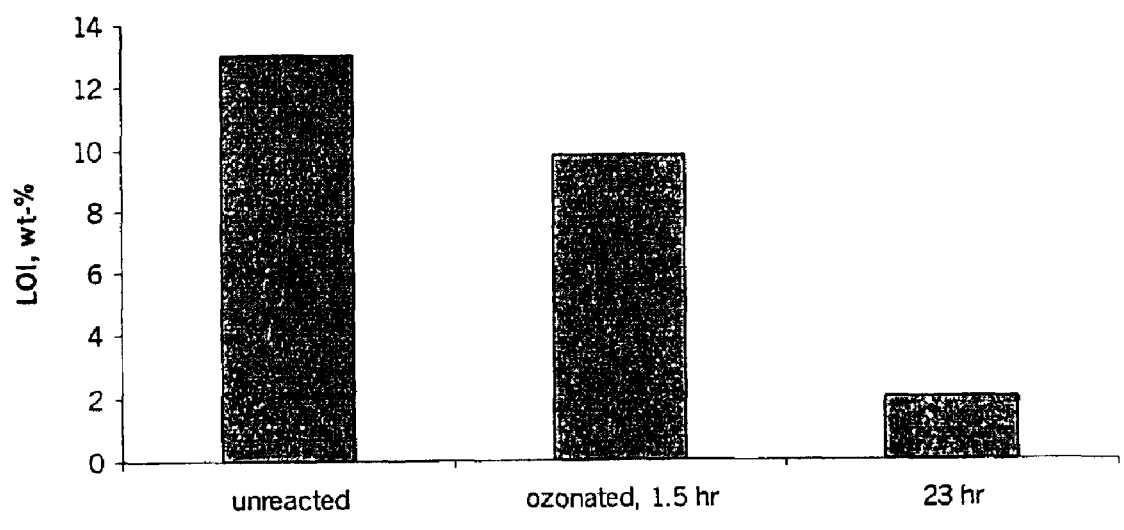
FIG. 6 shows the undesirable gasification (consumption) of fly ash carbon under heavy ozonation conditions. Reaction in 2 mole-% ozone in air: 1.5 liter/min; ash bed: 50 gm. At 1.5 hours the cumulative ozone fed is 115 gm/kg-ash: after 23 hours it is 1770 gm/kg.

FIG. 6 shows the effect of heavy ozone exposure on the carbon content of ash. At high ozone/carbon ratios ozone consumes the carbon, converting it to gaseous CO and $CO_2$ (gasification). This carbon consumption may be expected to further improve ash behavior somewhat, but consumes an excessive amount of ozone and is prohibitively expensive.

In contrast, FIGS. 1–4 show that the desired effect occurs at much lower ozone usages and is associated with surface modification, rather than bulk carbon consumption. These data indicate a two-step reaction process:

(1) $C+O_3 \rightarrow C(O)_{adsorbed}$ produces desired effect (reduced surfactant adsorptivity)

(2) $C+O_3 \rightarrow CO/CO_2$ consumes ozone with little further effect where the reaction expressions are shown in unbalanced form. The basis of the herein disclosed invention is the identification of reaction conditions that favor reaction 1 with minimum influence of reaction 2. These favorable reactions conditions are those that contact ash with 0.2–5 g-ozone/kg ash (or 10–300 g-ozone-kg-carbon) but avoid further exposure. Reaction 1 is fast (see FIG. 5) and dominates the reaction process at low ozone/carbon ratios. Further exposure beyond the stated range (0.2–5 g-ozone/kg ash or 10–300 g-ozone-kg-carbon) occurs at near surface saturation and results primarily in reaction 2 above, which continues to consumes ozone with very little benefit to ash quality.

The data and conditions above suggest favorable contacting schemes for fly ash and ozone. Favorable contacting schemes are those that inject ozone at a fixed point or points while mixing the solid ash to avoid prolonged exposure of any portion of the ash bed. The total ozone fed should be in the stated range of 0.2–5 g-ozone/kg ash (or 10–300 g-ozone-kg-carbon). The mixing can be mechanical (blenders, conveyers, ash conditioners, or equipment with similar operation) or aerodynamic (fluid beds, spouted beds, transport reactors, or equipment with similar operation). Another favorable contacting scheme is that in which ash and an ozone-containing gas are metered at a controlled ratio into a pneumatic conveying line. In this arrangement, no portion of the ash experiences prolonged exposure to fresh ozone and is thus not allowed to react beyond the preselected ozone-carbon or ozone/ash ratio of 0.2–5 g-ozone/kg ash (or 10–300 g-ozone-kg-carbon).

For comparison, a deep fixed bed with bottom injection of ozone would be an unfavorable contacting scheme. This is a common contacting scheme for other gas-solid processes, but is very unfavorable here because prolonged exposure of the bottom portion of the fly ash bed to ozone occurs before the top portion of the bed is treated. This leads to unnecessary and expensive consumption of ozone by reaction 2 above.

Different types of fly ash may require somewhat different ranges of ozone. The ranges used herein are to be understood as preferred ranges. It is to be further understood that the fly ash need not be that derived from coal, but could be derived from other fuels such as biomass, coal/biomass blends, petroleum coke, coal oil slurries, etc., and blends thereof.

The inventors have continued to improve their invention. Carbon in ash most commonly occurs as charred residues of the fuel, most typically coal, which did not completely burn in the combustion furnace. Other forms of carbon may also be present in certain cases, such as the charred residues of biomass, waste products, or petroleum coke that is co-fired with the primary fuel, e.g., coal. Additional forms of carbon also include activated carbon or other carbon-based sorbents added to the combustion flue gases to adsorb and capture mercury or other metals as well as other undesirable species. Carbon in ash may also include the charred residues from gasification systems, fluid bed combustion systems, or other combustion technologies that produce an ash stream that may be used in concrete. Carbon in ash may also be in the form of soot, or carbon black added to make colored concrete varieties. These varied carbon forms differ in their particle sizes and shapes, in their total surface areas and pore size distributions, as well as in the amount of impurities such as sulfur, surface oxygen, inorganic matter of diverse origin and composition. Nevertheless, all of these products are carbon materials and should show the same essential behavior when contacted with ozone. Ozone treatment for each of the above-mentioned carbon types is contemplated by the herein disclosed invention. Beside the sources of carbon set forth above, the inventors contemplate various carbon-based fuels such as oils and related liquid and semi-solid fuels, that are fired singly or co-fired with coal. All of these types are to be treated with ozone.

In a preferred embodiment of this invention, the amount of ozone to treat the carbon is 10–300 g-ozone-kg-carbon or said another way 1–50 $\mu$moles-ozone/m$^2$-total-carbon-surface area. It is to be understood that values herein set forth are idealized laboratory values and could readily be adjusted in actual practice by those skilled in the art.

Figure 10:
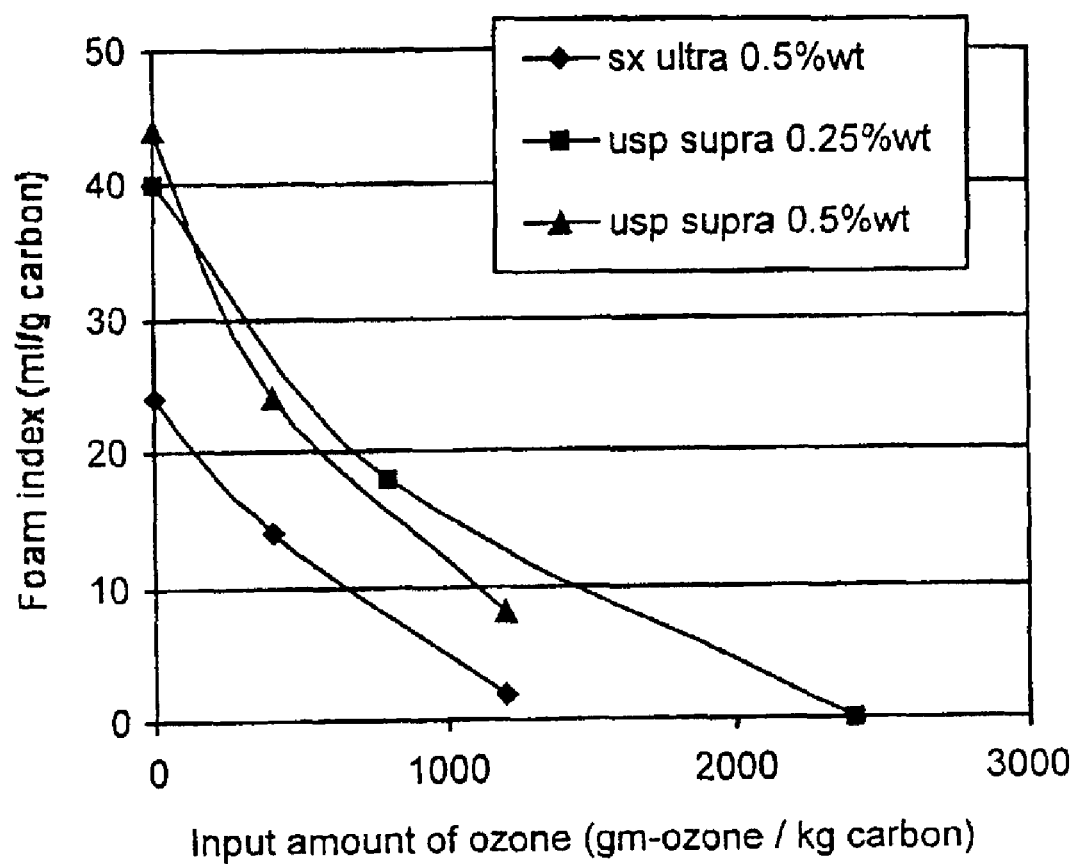
FIGS. 10–12 are graphs describing results obtained by ozone treatment of various carbon products.
Figure 11:
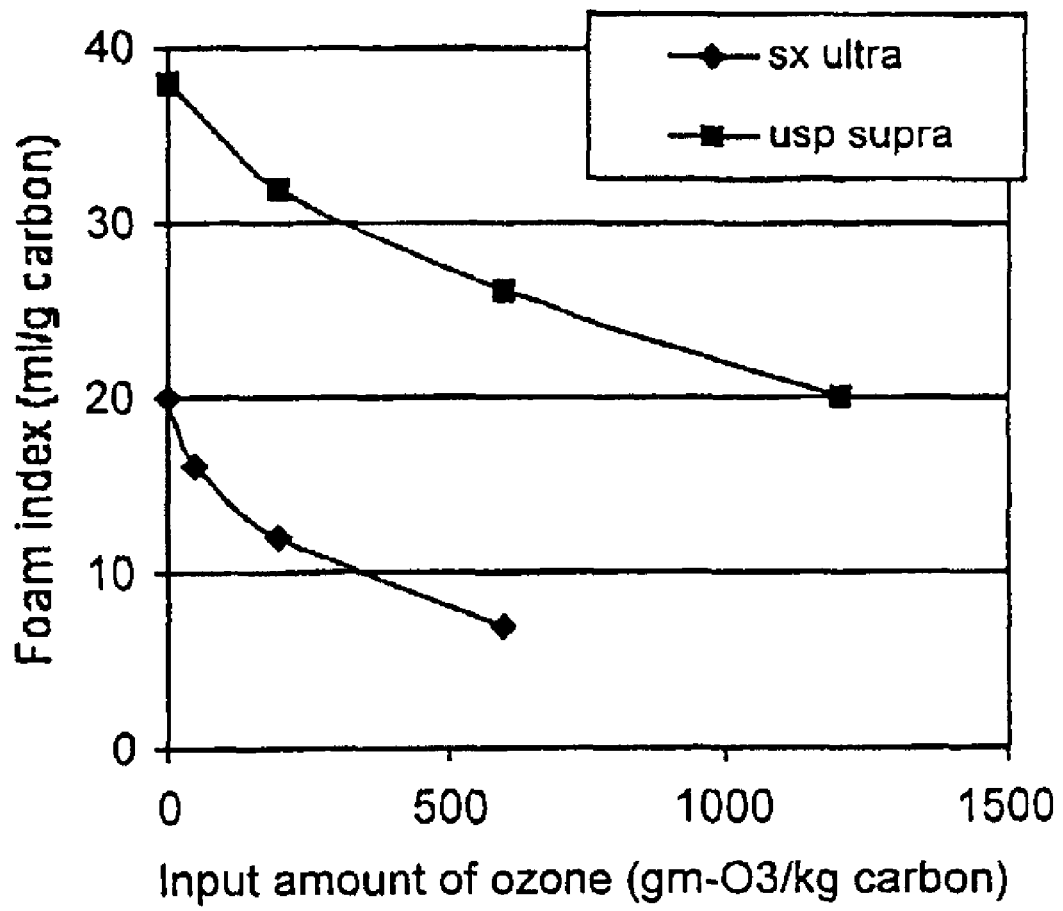
Figure 12:
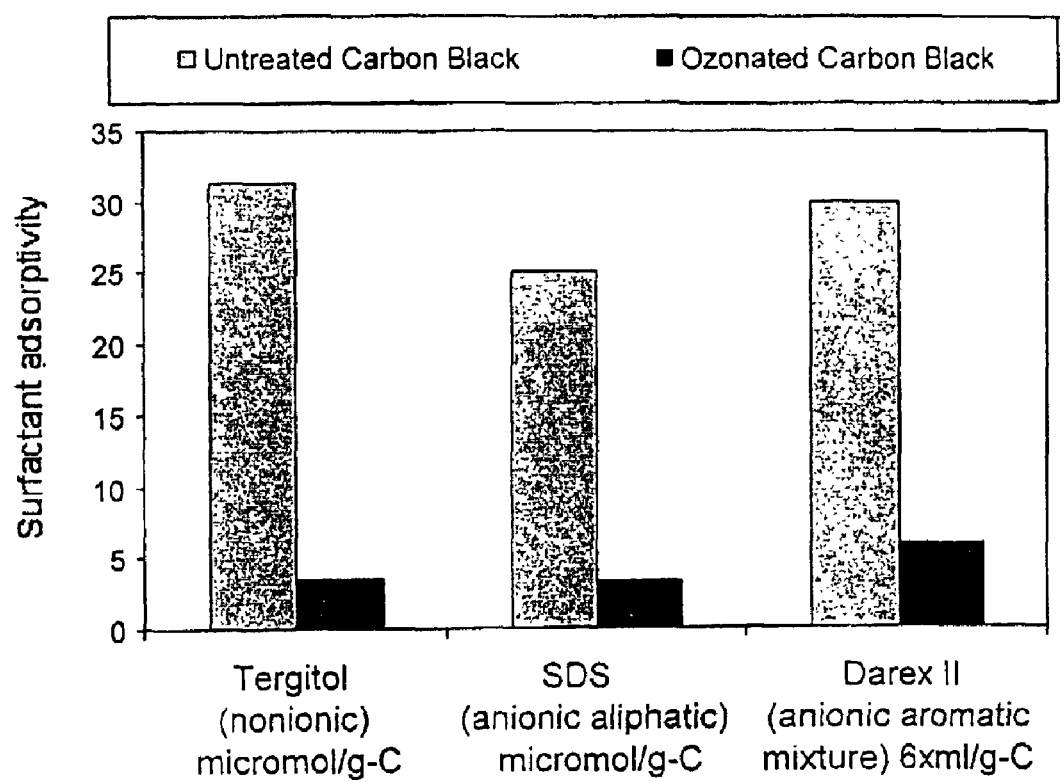

Referring to FIGS. 10–12, laboratory data for two example carbon materials other than unburned carbon are shown. FIGS. 10 and 11 show the effect of ozone treatment on the surface adsorptivity of a powdered activated carbon. The process is effective when applied to the activated carbon alone (FIG. 11), as would be the case when the sorbent is pretreated prior to its use for the capture of mercury or other metals. The process is also effective when applied to the carbon in the ash (FIG. 10), as would be the case when ozone treatment is applied to the final ash stream containing the sorbent and any unburned carbon from the fuel. FIG. 12 shows the effect of ozone treatment on the surfactant adsorptivity of carbon black toward three commercial surfactants.

In greater detail the figures describe as follows:

FIG. 10 illustrates effect of ozone treatment on the surface adsorptivity (foam index) of two types of commercial powdered activated carbon added to a carbon-free fly ash. The legend gives the activated carbon trade name and its weight percentage in the fly ash.

FIG. 11 describes the effect of ozone treatment on the surface adsorptivity (foam index) of two types of commercial powdered activated carbon. Ozone treatment is carried out in activated carbon bed (in the absence of fly ash) to simulate the ozone pretreatment of sorbents.

FIG. 12 shows the effect of ozonation on the standard adsorptivity (foam index) of carbon black using three commercial surfactants, including Darex II, the commercial air entraining admixture used in concrete. Ozone is effective at reducing the surfactant adsorptivity (foam index) of carbon black for each surfactant type.

The amounts of mercury or other metals adsorbed are extremely small, and it is therefore apparent that the ozone treatment will not be significantly affected by the presence of the adsorbed metal, and the process should be effective when carried out either before or after the adsorption event. We further expect that oxidants other than ozone will also be effective at pacifying activated carbon surfaces for improved air entrainment in concrete. Other surface oxidation methods include, but are not limited to, the use of air, oxygen, nitric acid, chromic acid, persulfate, permanganate, and hydrogen peroxide. Wet chemical oxidants are not particularly attractive for treating fly ash streams, but may be attractive for pre-treating the activated carbon sorbent, which will then be benign when is incorporated in ash and that ash is incorporated in concrete.

Also encompassed by this invention is a process in which ozone is used to pacify the surface of a carbon containing ash comprising applying an effective amount of ozone to said carbon containing ash and then adding the ozone-treated carbon containing ash to a second ash such that the mixture can be used for incorporation into concrete. Also, note that the second ash can be an ash in an ash stream.

The herein disclosed invention also discloses a concrete composition comprising concrete and an ozone treated carbon source material extrinsic to ash wherein the undesirable affect on air entrainment is reduced. The operative carbon source materials extrinsic to ash are exemplified by those set forth in this disclosure.

Obviously, many modifications may be made without departing from the basic spirit of the present invention. Accordingly, it will be appreciated by those skilled in the art that within the scope of the appended claims, the invention may be practiced other than has been specifically described herein. Those skilled in the art will recognize that the numeric amounts set forth in this invention are approximate values which can be varied by those skilled in the art without departing from the scope and spirit of this invention.

What is claimed is:

1. A process in which ozone is used to reduce the undesirable affect carbon has on concrete air entrainment comprising applying ozone to a carbon source material extrinsic to ash to produce a product having a reduced undesirable affect on concrete air entrainment and adding said ozone-treated carbon source material extrinsic to ash to a flue gas ash stream.

2. The process of claim 1 wherein the amount of ozone added to the carbon is 10–300 g-ozone-kg-carbon.

3. The process of claim 1 wherein the amount of ozone added to the carbon is 1–50 $\mu$moles-ozone/m$^2$-total-carbon-surface area.

4. A process in which ozone is used to reduce the undesirable affect carbon has on concrete air entrainment comprising applying ozone to carbon derived from the combustion of a member of the group consisting of biomass, waste materials, petroleum coke, petrochemicals, solid fuel gasification byproducts, and mixtures thereof in order to reduce the undesirable affect said carbon would have on concrete air entrainment when said carbon is to be incorporated into concrete.

5. A process in which ozone is used to reduce the undesirable affect carbon has on concrete air entrainment comprising applying ozone to carbon derived from activated carbon which has been added to capture mercury or other pollutants in a flue gas the applying of said ozone reducing the undesirable affect said activated carbon would have on concrete air entrainment when said activated carbon is incorporated into concrete.

6. A process in which ozone is used to pacify the surface of a carbon containing ash comprising applying an effective amount of ozone to pacify said carbon containing ash and then adding the ozone treated carbon containing ash to a second ash such that the mixture of ozone treated carbon containing ash and the second ash can be used for incorporation into concrete.

7. The process of claim 6 wherein the second ash is a flowing ash stream.

8. A process for reducing the undesirable affect on air entrainment of activated carbon based sorbents used to capture metal vapors, comprising oxidizing said activated carbon-based sorbents wherein said oxidizing reduces the undesirable affect on air entrainment when said activated carbon based sorbents are to be incorporated into ash and the ash subsequently used in concrete.

9. The process of claim 8 wherein the metal vapor is either oxidized or elemental mercury.

10. The process of claim 8 in which the oxidizing is accomplished with ozone.

11. The process of claim 8 in which the activated carbon-based sorbents are oxidized prior to their use as a mercury sorbent.

12. The process of claim 8 in which said activated carbon-based sorbents are oxidized in a fly ash stream containing both the activated carbon-based sorbents and any unburned carbon from a primary fuel.

13. A process of surface oxidation used to pacify the surface of a carbon containing source material extrinsic to carbon containing ash comprising the step of surface oxidation of said carbon containing source material extrinsic to carbon containing ash with ozone wherein said surface oxidation with ozone reduces the undesirable affect carbon has on concrete air entrainment thereby preparing a material useful for incorporation into concrete.

14. A process of surface oxidation used to pacify the surface of a carbon containing source material extrinsic to carbon containing ash comprising the step of surface oxidation of said carbon containing source material extrinsic to carbon containing ash with a member selected from the group consisting of air, oxygen and chromic acid with said surface oxidation reducing the undesirable affect on air entrainment thereby preparing a material useful for incorporation into concrete.

15. A concrete composition comprising concrete and an ozone treated carbon source material extrinsic to fly ash wherein the undesirable affect on concrete air entrainment is reduced in the treated carbon source material extrinsic to fly ash.

16. A method for pacifying activated carbon used as a mercury absorbent comprising applying ozone to said activated carbon and placing said ozone treated activated carbon in a flue gas stream to absorb mercury in said gas stream; and then employing said ozone treated activated carbon which has been used as a mercury absorbent as an additive to concrete.

* * * * *